United States Patent Office 3,058,153
Patented Oct. 16, 1962

3,058,153
VACUUM FORMING MOLDS
Richard D. Busch, New Castle, Del., assignor to Scott Paper Company, Philadelphia, Pa., a corporation of Pennsylvania
Filed Feb. 24, 1959, Ser. No. 795,073
4 Claims. (Cl. 18—19)

The present invention relates to mold structures which are particularly adapted for utilization in connection with the vacuum assisted shaping of sheets of organic thermoplastic resins.

The usual method of vacuum molding entails the conformation under atmospheric pressures of a heated sheet of an organic plastic to an evacuated, female mold. Modifications of this method include differential heating of the plastic for better control of bending moments and material movement as well as the application of shaping plugs to initiate plastic flow where radically deep draws are undertaken. Although a unitary mold structure is generally regarded as essential in vacuum molding techniques, for complex moldings where one or more re-entrant areas are formed in the plastic sheeting there must be provided separate mold sections movable inwardly to effect the auxiliary sheet shaping and retractable to permit ready removal or rejection of the finished molding.

A primary object of the present invention is to provide a vacuum forming mold in which shiftable mold sections are actuated by operating pressure differentials and their movements are correlated to the forming and releasing cycles involving such mold.

Another object of my invention is to provide a vacuum forming mold containing shiftable mold sections which permit the shaping of sheeted organic plastics with one or more re-entrant areas.

Figure 1:
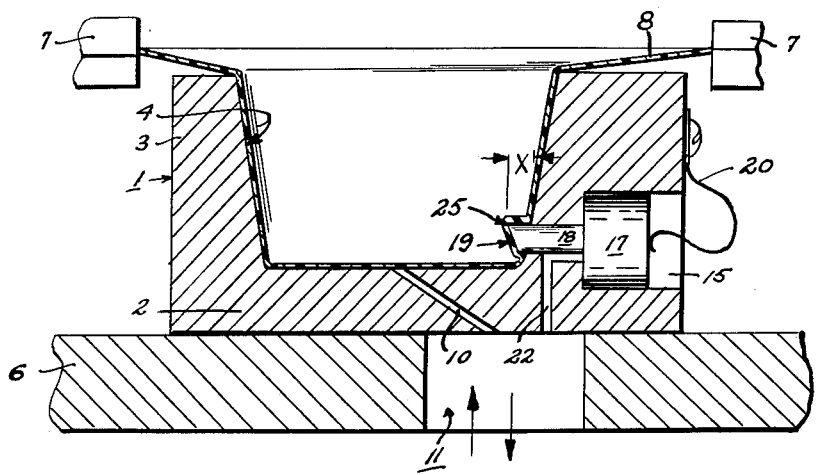
Figure 2:
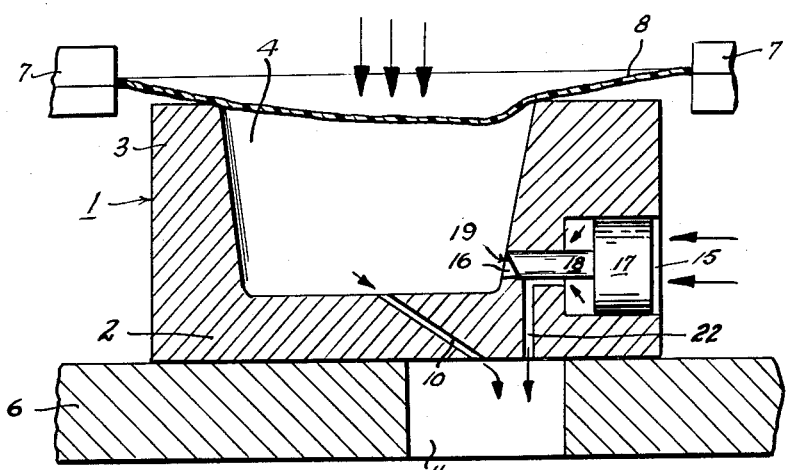

Other objects and advantages of my invention will be readily apparent from the following detailed description of a preferred embodiment thereof when taken in conjunction with the accompanying drawing wherein:

FIGURE 1 is a vertical section, partially in elevation of a mold structure embodying the features of my invention and FIGURE 2 is a vertical section, partially in elevation, of the mold structure of FIGURE 1, showing the relative location of the shiftable mold section at the initiation of the forming cycle.

Turning to the drawing, a mold 1 cast or machined from any suitable metal comprises a base portion 2 and a body portion 3 in which is provided a forming cavity 4 having a configuration corresponding to that of the outer surface of the article to be shaped therein. In general the mold cavity 4 will decrease in diameter from the mold opening downwardly, assuming the shape of an inverted truncated cone, in order that ejection of the finished, shaped article from the mold is enabled.

The mold 1 rests upon a bed plate 6 provided with suitable supporting structure (not shown) for a pair of spaced clamping members 7 adapted to position a sheet 8 of organic thermoplastic material above the mold 1 and in such near proximity thereto as to permit material entry into the mold upon generation of a pressure differential upon opposite sides of said sheet following its heating to plasticity as indicated in FIGURE 2.

In the base 2 of the mold 1 is provided a conduit 10 communicating with a port 11 in the plate 6 which is connected to any convenient source of vacuum, such as a vacuum pump, and alternately at will to an air pump from which fluid pressure may be introduced into the mold cavity 4.

In the side body 3 of the mold 1 is provided a transverse cylindrical chamber 15 connected by a channel 16 with the mold cavity 4, said chambr containing a piston 17 carrying suitable sealing rings (not shown) around its periphery and having a rod 18 which projects from its inner face and extends into the channel 16. The rod 18 with a terminal face 19 shaped as desired to modify the conformation of the mold cavity 4, is of sufficient length to extend into the mold cavity 4 when the piston 17 is at the base of the chamber 15 and yet is sufficiently short to permit its withdrawal from the mold cavity 4 when the piston 17 is adjacent the forward end of the chamber 15, as shown in FIGURE 2. A spring member 20 optionally is secured upon the exterior wall of the mold body 2 to engage the outer face of the piston 17, urging it toward the base of the chamber 15 and also precluding escape of said piston from said chamber 15. Wall stops or detents could, if desired, be arranged at the outer end of the chamber 15 to limit outward movement of the piston 17 therein. A conduit 22 connects the base of the chamber 15 with the port 11 in the plate 6 and enables the chamber 15 to be subjected to negative or positive fluid pressure to effect reciprocal movement of the piston 17 within the chamber 15, movement which is synchronized to the forming and releasing cycles involving the principal mold.

The manner of utilization of my improved mold structure in the formation of plastic articles, deep cylindrical receptacles, containers, cups or the like wherein one or more re-entrant areas 25 are provided to permit releasable nesting of the articles, should be self evident from the forgoing description of the apparatus. The plastic sheet 8, of cellulose acetate, an acrylate, polystyrene or other thermoplastic organic resin is secured between the clamps 7 over the mouth of the mold cavity 4 and subjected to heat until the necessary degree of plasticity for its shaping has been attained. As shown in FIGURE 2 the sheet 8 sags downwardly and closes the mouth of the mold cavity and thereafter the cavity 4 is evacuated through the conduit 10 whereby the sheet is drawn into the mold cavity and caused to assume the conformation thereof as shown in FIGURE 1. Evacuation of the mold cavity 4 is, however, accompanied by a reduction of pressure in the chamber 15 and a movement of the piston 17 to the bottom of the chamber 15 causing the rod 18 to project into the mold cavity 4 and to modify the shape thereof with the result that the re-entrant area 25 is produced in the molded article.

Removal of the shaped article from the mold by ordinary means would not be possible because of its interlock with the shifting mold section, the end 19 of the rod 18 projecting into the mold cavity, but by the application of positive fluid pressure to the port 11 and through conduits 10 and 22 to the base of the mold cavity 4 and the chamber 15 respectively, the rod 18 is withdrawn from the mold cavity and the molded article released and ejected. Under some circumstances, of course, as where the design of the re-entrant area 25 and the shape of the forming end 19 of the rod 18 do not result in a material interlock no special provision need be made for retraction of the rod 18 from the mold cavity 4. Upward movement of the molded article under simple ejection pressure or even a mechanical lifting of said article will cause the inner slope of the re-entrant area to wedge the rod 18 outwardly a distance sufficient to clear the edge of the molded article. In the next successive operation, when the mold cavity 4 is again evacuated, the rod 18 will be brought back into operative position.

It will be obvious that various modifications in the several elements of the adjustable mold construction and their arrangement to enable controllable mold configuration for the production of containers of any desired shape or type with re-entrant areas as desired are possible without departing from the spirit of the invention or the scope of the appended claims.

What I claim is:

1. In apparatus for forming an article from a thermally plasticized sheet, a mold body having a forming cavity therein, means for creating a pressure differential across said sheet to cause said sheet to move into and assume the configuration of said cavity, a member carried by said mold body and movable into and out of said cavity for modifying the configuration of the cavity, differential pressure responsive means for moving said modifying member, and means providing communication between said differential pressure responsive means and said pressure differential creating means, the arrangement being such that said fluid pressure creating means actuates said differential responsive means to cause said modifying member to move into said cavity as said sheet moves into said cavity.

2. In apparatus for forming an article from a thermally plasticized sheet, a mold body having a forming cavity therein, means for creating a vacuum in said cavity to draw said sheet into the cavity, a member carried by said mold body for movement into and out of said cavity for modifying the configuration of the cavity, differential pressure responsive means adapted to actuate said modifying member, and conduit means providing communication between said vacuum creating means and said differential pressure responsive means, said differential pressure responsive means being effective to move said modifying member into said cavity and hold the member therein when said cavity is under vacuum created by said vacuum creating means.

3. In apparatus for forming an article from a thermally plasticized sheet, a mold body having a forming cavity therein, means for creating in said cavity at one face of said sheet fluid pressure less than fluid pressure at the opposite face of said sheet to cause said sheet to move into said cavity and for creating in said cavity fluid pressure greater than the fluid pressure at said opposite face of said sheet for assisting removal of the formed sheet from the cavity, a member carried by said mold body for movement into and out of said cavity for modifying the configuration of the cavity, differential pressure responsive means for moving said member, and conduit means providing communication between said differential pressure responsive means and said fluid pressure creating means, said differential responsive means responding to said fluid pressure creating means to move said member into said cavity as the fluid pressure creating means moves said sheet into said cavity and to withdraw said member from said cavity as said fluid pressure creating means acts to assist removal of the formed sheet from said cavity.

4. In apparatus for forming an article from a thermally plasticized sheet, a mold body having a forming cavity therein, a member carried by said mold body and movable into and out of said cavity for modifying the configuration of the cavity, a chamber in said mold body exposed to atmospheric air pressure, differential pressure responsive means in said chamber for moving said modifying member, and conduit means communicating with said cavity and said chamber and connectable alternately to a source of vacuum and a source of pressurized air, the construction and arrangement being such that said differential pressure responsive means moves said modifying member into said cavity when the cavity and the pressure responsive means are subjected to a vacuum and said pressure responsive means moves said modifying member out of the cavity when the cavity and the pressure responsive means are subjected to pressurized air.

References Cited in the file of this patent

UNITED STATES PATENTS

| | | |
|---|---|---|
| 900,276 | Geffers | Oct. 6, 1908 |
| 2,282,423 | Kopitke | May 12, 1942 |
| 2,749,572 | Nowak | June 12, 1956 |
| 2,784,455 | Pulaski | Mar. 12, 1957 |
| 2,835,004 | Whitesell | May 20, 1958 |
| 2,917,793 | Olson et al. | Dec. 22, 1959 |
| 2,977,638 | Morin | Apr. 4, 1961 |